(12) United States Patent
Lee

(10) Patent No.: US 8,650,050 B1
(45) Date of Patent: Feb. 11, 2014

(54) PRESENTATION OF BENEFITS OF INSURANCE RELATED PRODUCTS

(75) Inventor: Eugene Lee, Albany, CA (US)

(73) Assignee: Guidewire Software, Inc., Foster City, CA (US)

( * ) Notice: Subject to any disclaimer, the term of this patent is extended or adjusted under 35 U.S.C. 154(b) by 94 days.

(21) Appl. No.: 13/197,103

(22) Filed: Aug. 3, 2011

(51) Int. Cl.
*G06Q 10/00* (2012.01)

(52) U.S. Cl.
USPC .............................................. 705/4; 705/1.1

(58) Field of Classification Search
USPC .......................................................... 705/1.1
See application file for complete search history.

(56) References Cited

U.S. PATENT DOCUMENTS

| | | | | |
|---|---|---|---|---|
| 5,923,328 | A * | 7/1999 | Griesmer ....................... | 715/854 |
| 5,999,945 | A * | 12/1999 | Lahey et al. ..................... | 1/1 |
| 2003/0040850 | A1 * | 2/2003 | Najmi et al. ...................... | 701/1 |
| 2004/0177678 | A1 * | 9/2004 | Grehlinger et al. .......... | 73/54.01 |
| 2005/0203884 | A1 * | 9/2005 | Allen et al. ....................... | 707/3 |
| 2005/0210052 | A1 * | 9/2005 | Aldridge ....................... | 707/101 |
| 2011/0283259 | A1 * | 11/2011 | Lawson et al. ................. | 717/121 |

* cited by examiner

*Primary Examiner* — William Rankins
(74) *Attorney, Agent, or Firm* — Van Pelt, Yi & James LLP

(57) ABSTRACT

Presenting benefits of an insurance related product includes obtaining a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company; receiving a user selection of at least some nodes in the master hierarchical benefits tree; determining a set of available nodes in a next hierarchical level based at least in part on the user selection; and generating a customized hierarchical benefits tree that is formed based at least in part on the user selection and the master hierarchical benefits tree.

17 Claims, 14 Drawing Sheets

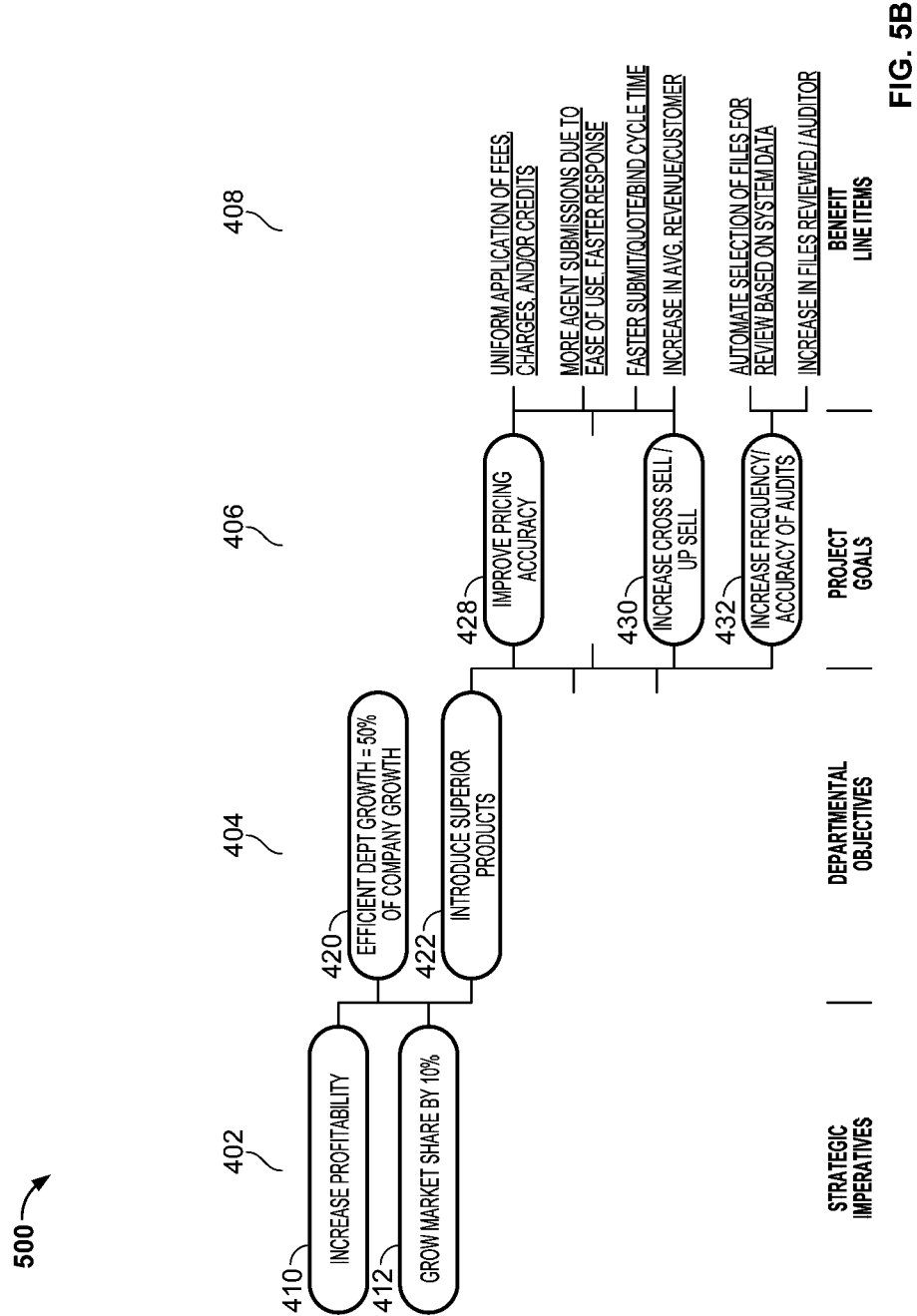

| Strategic Imperative Categories | Your Priority |
|---|---|
| Increase Profitability | Critical |
| Grow Market Share by 10% | High |
| Increase Customer and Agent Satisfaction/Delight | Medium |
| Outperform Industry Combined Ratio by 5 Points | Low |

FIG. 6

| Applicable Strategic Categories | Departmental Objective Categories | Your Priority |
|---|---|---|
| Increase Profitability; Grow Marker Share | Policy Process Flexibility (New Product/Territory) | Medium |
| Increase Profitability; Grow Marker Share | Efficient Department Growth = 50% of Company Growth | High |
| Increase Profitability; Grow Marker Share | Introduce Superior Products | Critical |

FIG. 7

| ASSOCIATED DEPARTMENTAL OBJECTIVES | PROJECT GOAL CATEGORIES | YOUR PRIORITY |
|---|---|---|
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | REDUCE TIME REQUIRED FOR SYSTEM CHANGES | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | REDUCE TRAINING TIME FOR NEW EMPLOYEES | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | INCREASE PROCESSING EFFICIENCY | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | IMPROVE DATA QUALITY AND ANALYSIS | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | FLEXIBLE PRODUCT DEFINITION / UPDATE | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | IMPROVE PRICING ACCURACY | HIGH |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | INCREASE NEW BUSINESS SUBMISSIONS | MEDIUM |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | INCREASE CROSS SELL / UP SELL | CRITICAL |
| POLICY PROCESS FLEXIBILITY (NEW PRODUCT/ TERRITORY); EFFICIENT DEPARTMENT GROWTH = 50% OF COMPANY GROWTH; INTRODUCE SUPERIOR PRODUCTS | INCREASE FREQUENCY / ACCURACY OF AUDITS | HIGH |

FIG. 8

| BENEFIT LINE ITEM | BENEFIT CATEGORY | BENEFIT AREA | MEASURABLE | FINANCIAL | METRIC | CURRENT STATUS | FORMULA USED | CHANGE OR IMPROVEMENT | ESTIMATED FINANCIAL BENEFIT |
|---|---|---|---|---|---|---|---|---|---|
| IMPROVED DETECTION OF POTENTIALLY FRAUDULENT CLAIMS | LOSS COST | FRAUD | CURRENTLY MEASURABLE | YES | % OF CLAIMS REFERRED TO SPECIAL INVESTIGATIONS | 0.05 | (INCREASE IN REFERRAL %) * (WALKAWAY %) * (AVG COST PER CLAIM) * (# OF TOTAL CLAIMS) | 0.006 | $105,000 |
| EARLIER DETECTION AND REFERRAL OF POTENTIAL FRAUD | LOSS COST | FRAUD | FUTURE MEASURABLE | NO | # OF DAYS FROM FIRST NOTICE TO FRAUD REFERRAL | | | | |
| REDUCTION IN ERRONEOUS OR UNNECESSARY FRAUD REFERRALS | EFFICIENCY | FRAUD | FUTURE MEASURABLE | YES | % OF REFERRED CLAIMS THAT SHOULD NOT HAVE BEEN | | (% OF SIU TIME SPENT ON AVOIDABLE, ERRONEOUS REFERRALS) * (SALARY/ COST PER SIU SPECIALIST) * (# OF SIU STAFF) | | |
| INCREASED CLAIM HANDLER AWARENESS OF SUSPECTED FRAUD | LOSS COST | FRAUD | DIFFICULT TO QUANTIFY | NO | | | | | |
| REDUCED LITIGATION COSTS ON SUSPECTED FRAUDULENT CLAIMS | EXPENSE | FRAUD | FUTURE MEASURABLE | YES | AVERAGE LITIGATION COST PER SUSPECTED FRAUD CLAIM | | | | |
| REDUCTION IN USAGE OF OUTSIDE INVESTIGATORS (FRAUD) | EXPENSE | FRAUD | CURRENTLY MEASURABLE | YES | AVERAGE INVESTIGATION COST PER SUSPECTED FRAUD CLAIM | 500 | (REDUCTION IN OUTSIDE INVESTIGATOR USAGE) * (AVG OUTSIDE INVESTOR COST PER FRAUD CLAIM) | | |
| INCREASE CLAIMANT "WALKAWAYS" ON SUSPECTED FRAUD CLAIMS | LOSS COST | FRAUD | FUTURE MEASURABLE | YES | % OF SUSPECTED FRAUD CLAIMS THAT RESULT IN "WALKAWAY" | 0.05 | (INCREASE IN WALKAWAY %) * (AVG PAID PER SUSPECTED FRAUDULENT CLAIM) | 0.018 | $315,000 |
| BETTER FRAUD IDENTIFICATION CRITERIA/RULES DUE TO IMPROVED DATA GRANULARITY/QUALITY | LOSS COST | FRAUD | DIFFICULT TO QUANTIFY | NO | | | | | |

FIG. 9

| INITIATIVE: | RECOVERY | | | | | | | | |
|---|---|---|---|---|---|---|---|---|---|
| ID | BENEFIT LINE ITEM | $ BENEFIT | METRIC | BASELINE | EXPECTED | LOW | HIGH | BUSINESS RATIONALE | APPL? | IMPACT | BENEFIT AN |
| 18 | IMPROVED / AUTOMATED IDENTIFICATION OF POTENTIAL SUBROGATION RECOVERY OPPORTUNITIES (3RD PARTY) | 2,100,00 | SUBROGATION REFERRAL RATE | 0.3 | 0.006 | 0.0025 | 0.02 | | ☐ | HIGH | RECOVERY |
| 19 | IMPROVED COMPARATIVE LIABILITY DETERMINATION | 1,750,000 | COMPARATIVE LIABILITY % | 0.35 | 0.005 | 0.0025 | 0.015 | | ☐ | HIGH | RECOVERY |
| 22 | INCREASED # OF SUBROGATION FILES HANDLED PER SUBROGATION SPECIALIST | 180,625 | AVERAGE # OF FILES HANDLED PER SUBRO SPECIALIST | 300 | 17 | 10 | 45 | | ☐ | LOW | RECOVERY |
| 24 | FASTER RECOVERY CYCLE TIME-GETTING RECOVERY PAYMENTS IN FASTER | 52,932 | AVERAGE # OF DAYS TO RECOVERY RECEIPT | 80 | 4.6 | 2 | 15 | | ☐ | MEDIUM | RECOVERY |
| 93 | FASTER MORE ACCURATE...... | | # OF DAYS TO.... | | | | | | ☐ | HIGH | RECOVERY |

FIG. 10

| ID | CUSTOME | BENEFIT LINE ITEM | METRIC | GUIDEWIRE ENABLEMENT | BENEFIT | BUSIN |
|---|---|---|---|---|---|---|
| 1 | ☒ | IMPROVED DETECTION OF POTENTIALLY FRAUDULENT CLAIMS | % OF CLAIMS REFERRED TO SPECIAL INVESTIGATIONS | DUPLICATE PAYMENT CHECKING, BUSINESS RULES, CLAIM HISTORY / AUDIT TRACKING, CLAIMCENTER DATAMODEL, COMPREHENSIVE NOTES FUNCTIONS, FNOL SNAPSHOT, GEOCODING, INTEGRATION FRAMEWORK, ISO INTEGRATION, METRO INTEGRATION, SINGLE SYSTEM OR RECORD, UNIFIED CLAIM FOLDER | LOSS COST | HIGH |
| 2 | ☒ | EARLIER DETECTION AND REFERRAL OF POTENTIAL FRAUD | # OF DAYS FROM FIRST NOTICE TO FRAUD REFERRAL | | LOSS COST | HIGH |
| 3 | ☒ | REDUCTION IN ERRONEOUS OR UNNECESSARY FRAUD REFERRALS | % OF REFERRED CLAIMS THAT SHOULD NOT HAVE BEEN | | EFFICIENCY | LOW |

☐ 24X7 AVAILABILITY
☐ ACTIVITY CALENDAR
☐ AD-HOC SEARCH CAPABILITY
☐ ADVANCED SECURITY MODEL
☐ ASSOCIATION / LINKING OF RELATED CLAIMS
☐ AUTHORITY LIMITS
☐ AUTOMATED ACTIVITY ESCALATION WORKFLOW
☐ AUTOMATED CLAIM SEGMENTATION AND ASSIGNMENT
☐ AUTOMATED CORRESPONDENCE GENERATION WITH DATA
☒ AUTOMATED DUPLICATE CLAIM CHECKING
☒ AUTOMATED DUPLICATE PAYMENT CHECKING
☐ AUTOMATIC DEDUCTIBLE HANDLING
☐ BULK PAYMENT FUNCTIONALITY
☐ BUSINESS CONTROLLED ADMINISTRATION / CONFIGURATION
☒ BUSINESS RULES
☐ CATASTROPHE MANAGEMENT FEATURES

[ OK ] [ CANCEL ]

FIG. 12

PRESENTATION OF BENEFITS OF INSURANCE RELATED PRODUCTS

BACKGROUND OF THE INVENTION

When faced with decisions about large scale infrastructure investments in insurance operations, insurance carriers typically require some form of cost-benefit analysis to determine whether the investments will create enough benefits to justify their costs. Sales team for enterprise scale insurance software products often have to come up with business cases that evaluate the costs and benefits for the decision makers. For example, some existing techniques for determining the benefits of adopting a new insurance platform would express benefits achieved by the new software, such as process automation, ease of documentation, faster claims processing, etc., into time savings (i.e., "minutes saved") multiplied by average employee salaries to calculate the business benefits to justify the purchase decision. Such techniques are often manual and laborious, and typically only provide high level, coarse grained analysis based on ad-hoc assessments of the benefits. Ineffective use of metrics often cause decision makers to focus on easily measurable benefits like efficiency gain and cost savings, yet overlook important but not as easily quantifiable benefits such as securing new market opportunity, maintaining competitive edge, and achieving sustained underwriting profitability. The typical techniques used today are often manual, built from scratch on a case by case basis, and offer little in the way of verifying whether the benefits are actually achieved.

BRIEF DESCRIPTION OF THE DRAWINGS

Various embodiments of the invention are disclosed in the following detailed description and the accompanying drawings.

FIG. 5A-5B are data structure diagrams illustrating an embodiment of a process for forming a customized hierarchical benefits tree.

FIGS. 6-8 are user interface diagrams illustrating embodiments of user interfaces used to configure the example hierarchical benefits tree.

FIG. 9 is a diagram illustrating an embodiment of a display of applicable benefit line items included in a customized hierarchical benefits tree.

FIG. 10 is a diagram illustrating an embodiment of a user interface for reporting the benefits achieved.

FIG. 12 is a user interface diagram illustrating an embodiment of a user interface used to connect benefit line items with product features.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Presenting benefits of an insurance related product for evaluation is disclosed. In some embodiments, a master hierarchical benefits tree is preconfigured. The master hierarchical benefits tree comprises a plurality of hierarchical levels, some of which are used to represent different levels of objectives of an insurance company. In some embodiments, one of the levels include a plurality of benefit line items (BLIs) that indicate specific benefits achieved by the insurance related product under evaluation. The user makes selections of nodes in various hierarchical levels that correspond to pertinent objectives. A customized hierarchical benefits tree is formed based at least in part on the user's selection and the master tree. In some embodiments, the user is allowed to enter one or more expected performance levels associated with the BLIs. The actual performance of the product is measured over time and compared with the expected performance levels.

Figure 1:
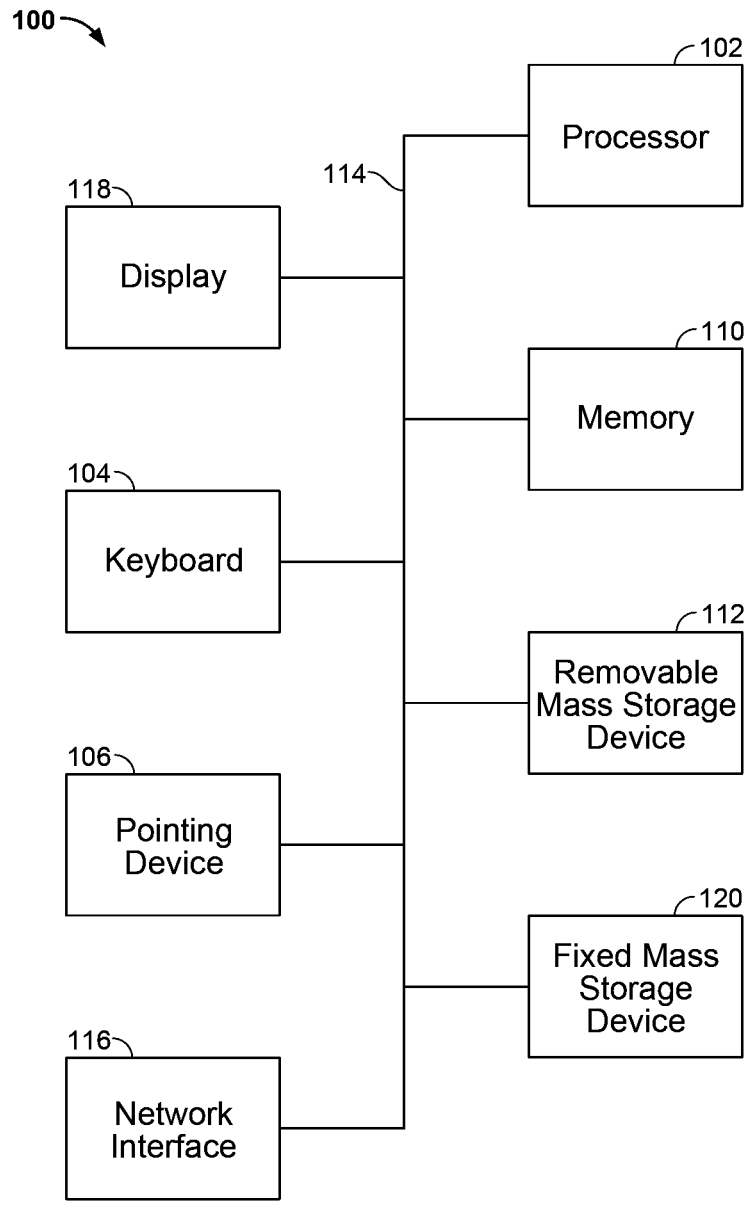
FIG. 1 is a functional diagram illustrating an embodiment of a programmed computer system for providing techniques for presenting benefits of an insurance related product.

FIG. 1 is a functional diagram illustrating an embodiment of a programmed computer system for providing techniques for presenting benefits of an insurance related product. As will be apparent, other computer system architectures and configurations can be used to perform techniques for presenting benefits of an insurance related product. Computer system 100, which includes various subsystems as described below, includes at least one microprocessor subsystem (also referred to as a processor or a central processing unit, CPU) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data and the output and display of data on output devices (e.g., display 118). In some embodiments, processor 102, for example, in communication with a memory 110 (or other computer readable storage medium element(s)/device(s)), includes and/or is used to implement techniques for presenting benefits of an insurance related product as described herein.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100 and is coupled either bidirectionally (read/write) or unidirectionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, trackball, or tablet and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card, or similar device, and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network, such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. A computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
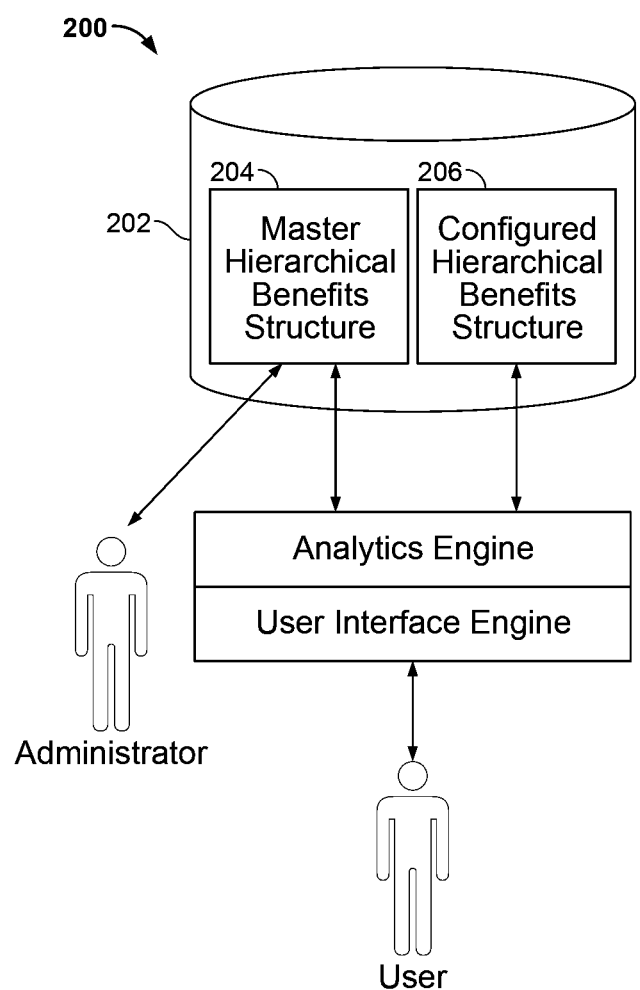
FIG. 2 is a block diagram illustrating an embodiment of a system for presenting benefits analysis of an insurance related product.

FIG. 2 is a block diagram illustrating an embodiment of a system for presenting benefits analysis of an insurance related product, such as a software platform supporting insurance claim, underwriting, and/or billing functions. System 200 may be implemented on a computing platform such as 100. In some embodiments, system 200 is implemented as a stand-alone computer program product, or as a part of other program products. In some embodiments, system 200 is implemented to operate over a network. In some embodiments, the system is deployed by a vendor whose product is under evaluation by a potential customer. The system organizes complex information about the potential benefits of the product, allows the potential customer to make adjustments tailored to their particular situation, and presents the information to the potential customer in a clear, concrete way to facilitate decision making.

In this example, the system includes a data portion and a processing portion. The data portion may be implemented using a database such as Microsoft Access®, MySQL, or other appropriate techniques such as file based data storage. The data portion includes a preconfigured master hierarchical benefits data structure 204. In some embodiments, the master hierarchical benefits structure is set up by an administrator, who is typically an expert familiar with the objectives of an insurance company and the product under evaluation. The master hierarchical benefits structure represents different levels of objectives of potential customers (e.g., insurance carriers), the benefits and features provided by the product under evaluation, and the interconnections thereof. It can be configured by the administrator via the user interface engine or other configuration tools and saved to the database.

The user interface engine renders the master hierarchical benefits structure to a user (e.g., a decision maker for the potential customer) and receives user selection of specific objectives that are of interest to the user/potential customer. The analytics engine determines a configured hierarchical benefits structure 206 based at least in part the user's selection, and saves it to the database. In addition, the analytics engine may evaluate measurable metrics associated with some of the benefits line items in the configured hierarchical benefits structure, determine difficult to measure benefits, and present the measurable metrics and/or the difficult to measure benefits to the user via the user interface engine in an output device such as display 118 of FIG. 1. Details of the hierarchical structures, analytics engine, and user interface engine are discussed below.

For purposes of illustration, hierarchical tree structures are described in the following specification, although other appropriate hierarchical structures can also be used. In some embodiments, the master hierarchical benefits tree is set up by an expert user familiar with the objectives of an insurance company. Nodes in the higher levels of the hierarchical benefits tree correspond to objectives/goals of the insurance company. Nodes in the lowest (i.e., most detailed) level in the hierarchical tree represent specific benefits provided by the product under evaluation. These nodes are referred to as benefits line items (BLIs).

Figure 3A:
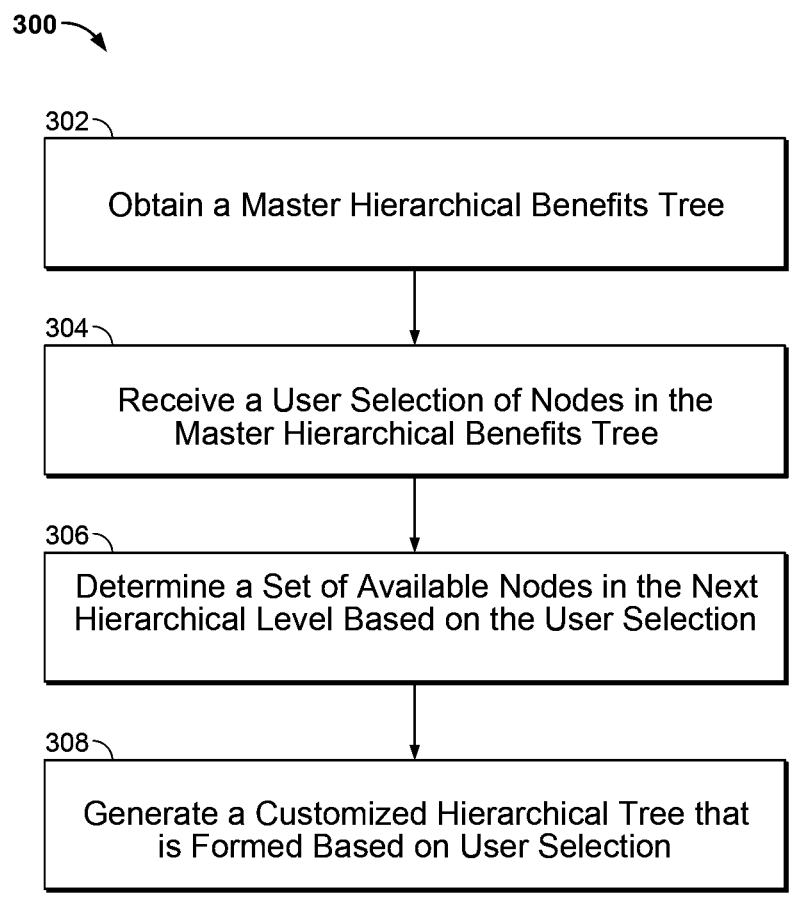
FIG. 3A is a flowchart illustrating an embodiment of a process for a hierarchical benefits tree based presentation of insurance related investment benefits.

FIG. 3A is a flowchart illustrating an embodiment of a process for a hierarchical benefits tree based presentation of insurance related investment benefits. Process 300 may be implemented on a system such as 100. Process 300 begins at 302, where a master hierarchical benefits tree comprising a plurality of hierarchical levels is obtained. In some embodiments, the master hierarchical benefits tree is obtained by a processor from a database. The master hierarchical benefits tree is displayed to the user, who is allowed to select specific nodes in the master hierarchical tree to represent specific goals or objectives of the insurance company.

At 304, a user selection of one or more nodes in the master hierarchical benefits tree is received. As will be described in greater detail below, the selection of nodes in one hierarchical level determines which nodes are available in the next level. Thus, at 306, a set of available nodes in the next hierarchical level is determined based at least in part the selection. Steps 304 and 306 may be repeated for multiple levels until the last level in the hierarchical tree is reached. At 308, a customized hierarchical benefits tree is generated based at least in part on the user selections. A view of the customized hierarchical benefits tree (or portions thereof) is presented to the user and displayed in an output device such as display 118 of FIG. 1. As will be described in greater detail below, the customized hierarchical benefits tree facilitates decision making by translating various categories of objectives of the potential customer into visual displays of specific benefit line items, their associated metrics, and product features.

Figure 3B:
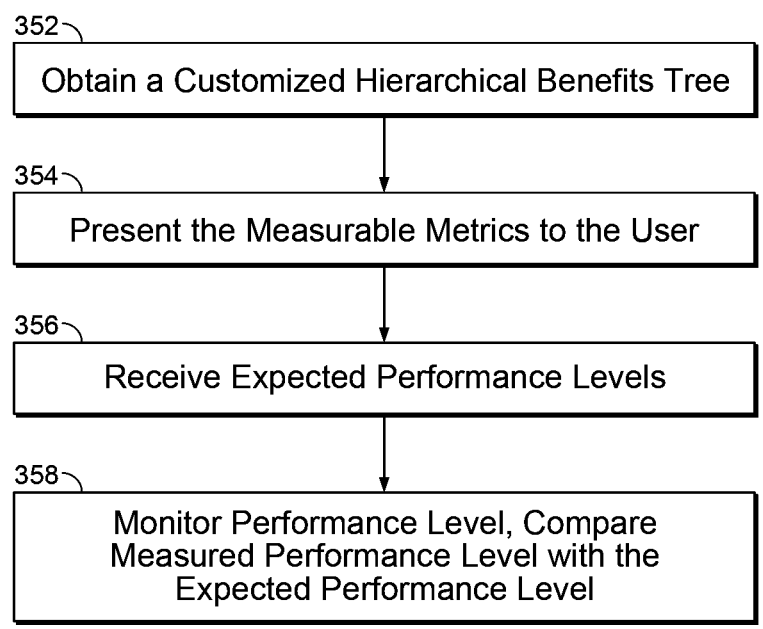
FIG. 3B is a flowchart illustrating an embodiment of a process for verifying the benefits achieved by an insurance related product.

The customized benefits tree provides a clear way to communicate how specific benefits/features of the product address the potential customer's objectives. In some embodiments, the customized hierarchical benefits tree is further used to conduct verification of the benefit line items. FIG. 3B is a flowchart illustrating an embodiment of a process for verifying the benefits achieved by an insurance related product. At 352, a customized hierarchical benefits tree (such as a customized hierarchical benefits tree generated via process 300) is obtained. The customized hierarchical benefits tree has a plurality of hierarchical levels, each comprising one or more nodes. At least one node in each level connected to at least one other node in an adjacent hierarchical level. One of the hierarchical levels includes a plurality of BLIs. At least some of the BLIs in the customized tree have measurable predefined insurance operational metrics. At 354, the measurable metrics associated with the customized BLIs are presented to the user. At 356, one or more expected performance levels associated with one or more metrics are received as user inputs. It is assumed that the product is implemented by the potential customer, either as an actual purchase or a trial. The performance level of metric is monitored over time and compared with the expected performance level to give the user a way to verify the benefits achieved, at 358.

Figure 4:
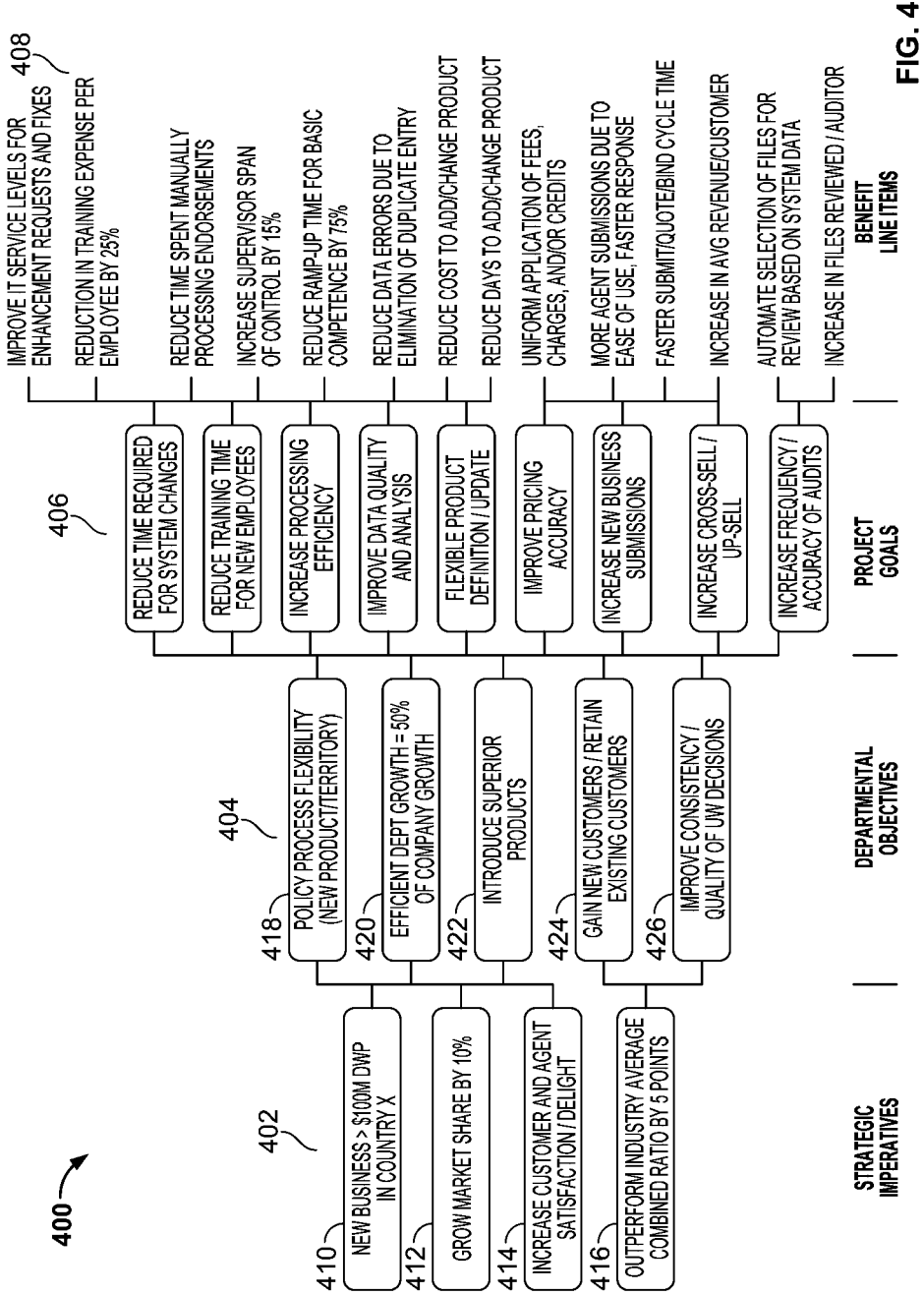
FIG. 4 is a data structure diagram illustrating an embodiment of a subset of the master hierarchical benefits tree.

FIG. 4 is a data structure diagram illustrating an embodiment of a subset of the master hierarchical benefits tree. In the example shown, the benefits tree has a plurality of hierarchical levels, with the left most hierarchical level being the highest level in the hierarchy. Other representation of the hierarchical structure such as a top down tree or a table may be used in other embodiments. Four hierarchical levels are shown in the example. The first (left most) three levels of the tree represent different categories of objectives within the corporation, from broad to narrow. Specifically, the highest level 402 represents the insurance company's overall strategic imperatives; the next level 404 represents objectives of various departments within the insurance company; and the subsequent level 406 represents objectives of various projects that are carried out by the departments. The last level 408 represents the benefit line items that can be achieved by the insurance operational product under evaluation. In other embodiments, the number of levels and their representations within the hierarchical tree may vary. For example, a large insurance company may have additional or alternative levels to represent objectives of different regions, different lines of business, etc.

Each hierarchical level includes a number of nodes. The nodes in levels 402-406 represent specific categories of objectives for their respective levels. The highest corporate level objectives are relatively broad and include examples such as growing new business, growing market share, increasing customer and agent satisfaction, and outperforming industry average. The nodes in the departmental objectives level are more specific and tailored to various departments such as billing, claims, marketing, underwriting, etc. The nodes in the project goals level are narrower still. The benefit line items indicate specific benefits that are achieved by the insurance operational product under evaluation, and have specific metrics used to evaluate the benefits in a concrete, easy to understand way. Different nodes may be specified in different embodiments depending on customer needs and the product under evaluation.

A node in the hierarchical benefits tree is connected to one or more nodes in immediately adjacent levels. There can be 1-to-1, 1-to-many, many-to-many relationships between the nodes that are reflected by the connections. In this example, strategic imperatives nodes 410, 412, and 414 of level 402 are each connected to departmental objectives nodes 418, 420, and 422 of level 404. Strategic imperatives node 416 of level 402 is connected to nodes 424 and 426. In other words, new business in country X, grow market share, and increase customer and agent satisfaction are strategic imperatives that are supported by departmental objectives of policy process flexibility, efficient depth growth, and introduction of superior products, but are not meaningfully related to departmental objectives of gaining new customers (within this country) and improving consistency/quality of underwriting decisions. Each departmental objectives node in level 404 is connected to all the project goals nodes in level 406. The first 5 project goals nodes of level 406 are connected to the first 8 benefit line items nodes of level 408, the next 3 project goals nodes are connected to the next four benefit line items nodes, and the last project goal node is connected to the last two benefit line items nodes. As with the specification of the levels and their associated nodes, the interconnections between the nodes are preferably specified by the expert administrator.

Returning to process 300, once a master hierarchical benefits tree such as tree 400 illustrated in FIG. 4 is obtained from its storage location, the system presents the user (typically a decision maker for the potential customer or an aide to the decision maker) with options to select objectives that are of interest to form a customized benefits tree that illustrates which benefit line items ultimate support the objectives of the corporation, so that the user can more easily understand where the benefits come from, how they are evaluated, and ultimately be able to verify actual benefits achieved.

Figure 5A:
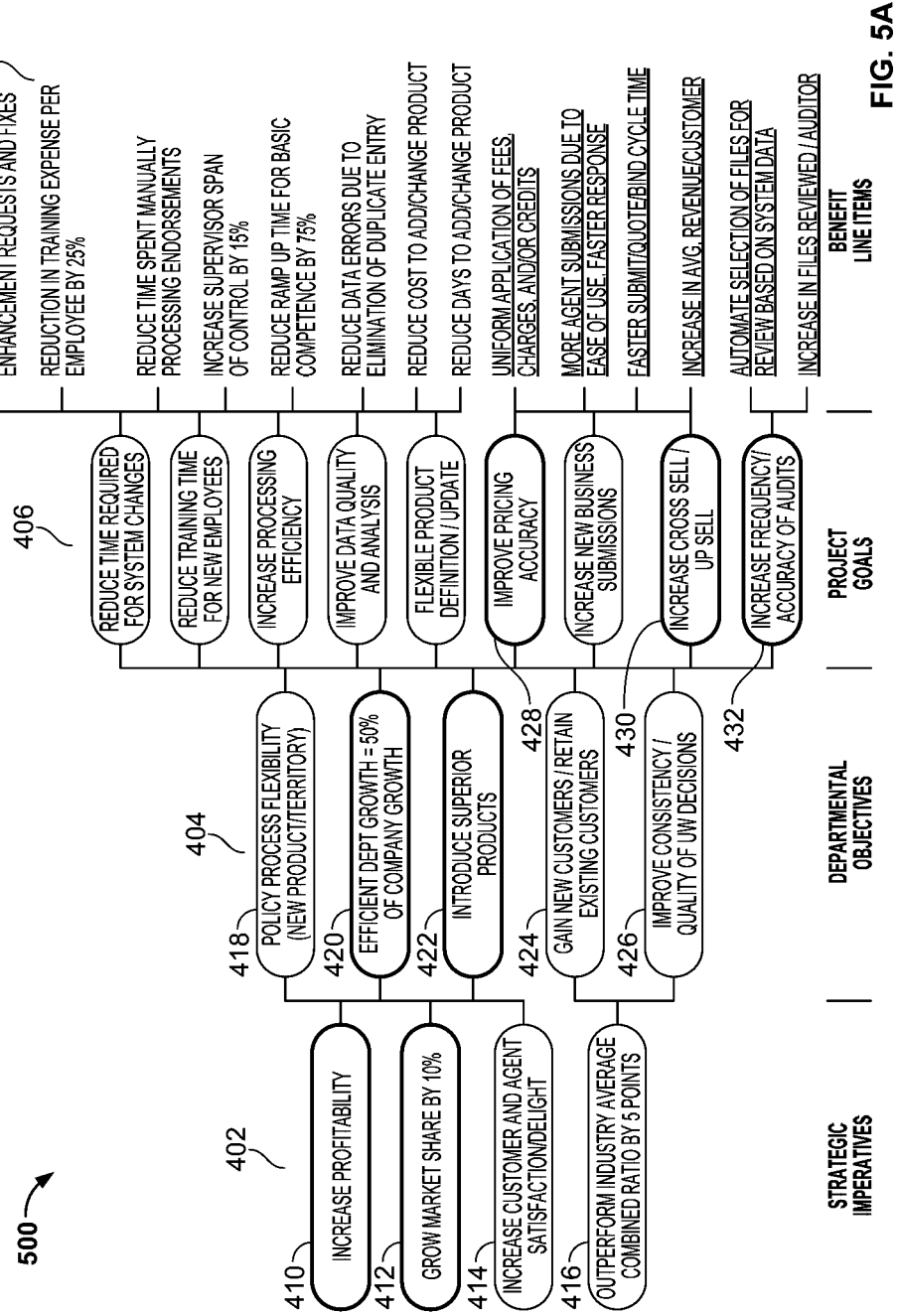

FIG. 5A-5B are data structure diagrams illustrating an embodiment of a process for forming a customized hierarchical benefits tree. In this example, a customized benefits tree is formed based at least in part on the master benefits tree of FIG. 4 and user selections. In FIG. 5A, the user is initially presented with the option to select one or more strategic imperatives in level 402. In this example, among the four available strategic imperative categories, 410 and 412 ("increase profitability" and "grow market share by 10%") are selected as the most significant strategic imperative to the potential customer. A set of available nodes in the next hierarchical level 404 are determined based on the user selection. Since the selected strategic imperatives are connected to nodes 418, 420, and 422, these departmental objectives are available and are presented to the user for further selection. Nodes 424 and 426, which are unconnected to 410 and 412, are not available for user selection and thus are shown in dashed outlines. This time, the user selects nodes 420 and 422 ("efficient department growth=50% of company growth" and "introduce superior products") as the most relevant or important departmental objectives. Accordingly, nodes in the next level 406 that are connected to nodes 420 and 422 become available for further user selection. In this example, all nodes in the next level are connected to nodes 420 and 422, and therefore are available for the user's next selection. The user selects nodes 428 ("improve pricing accuracy"), 430 ("increase cross sell/up sell"), and 432 ("increase frequency and accuracy of audits") as key project goals. The benefit line items that are linked to these specific goals are presented to the user. In this case, "uniform application of fees, charges, and/or credits", "more agent submissions due to ease of use, faster response", "faster submit/quote/bind cycle times", "increase in average revenue per customer", "automated selection of files for review based on system data", and "increase in files reviewed" are benefit line items that support the various levels of objectives. The user selection process prunes the hierarchical benefits tree and matches specific benefit line items to the particular goals set by the user. The final customized tree is shown in FIG. 5B. As will be discussed more fully below, the metrics associated with these benefit line items are computed to illustrate, in measurable quantities such as money, cycle time, etc., how a benefit is achievable in support of specific goals.

FIGS. 6-8 are user interface diagrams illustrating embodiments of user interfaces used to configure the example hierarchical benefits tree. FIG. 6 shows an embodiment of a user interface used to configure a strategic imperative hierarchical level in an example hierarchical benefits tree such as the one shown in FIG. 4. The user interface shown in this example corresponds to the selection of level 402 of FIG. 4. Four categories in this hierarchical level are listed. Each category corresponds to a node in the hierarchical tree. The user is given the option to specify the priority of each objective. Critical, high, medium, and low are available selections in this example. Critical or high priority translates into a user selection of the corresponding category, and medium, low, or unspecified priority means there is no selection. In some embodiments, a suggested priority level is provided and the user is given the option to modify the suggested priority level. In some embodiments, the user is also given the option to define the meaning of each strategic imperative category in his own words.

FIGS. 7 and 8 are user interface diagrams illustrating embodiments of user interfaces used to configure additional levels in the example hierarchical benefits tree. In FIG. 7, departmental objective categories associated with the selected strategic imperative category are displayed. The user interface shown in this example corresponds to the selection of level 404 of FIG. 4. As described in connection with FIG. 5, the interconnections of the strategic imperatives and departmental objectives in the master tree and the choices of strategic imperatives by the user determine which departmental objectives are available for the next level of user selection. The user is given the option to specify, for each departmental objective category, a priority. The critical or high priority categories are considered to be selected, and the medium priority categories not selected. In FIG. 8, project goals connected to the selected departmental objectives are made available for user selection. The user interface shown in this example corresponds to the selection of level 406 of FIG. 4. The user specifies a project goal selection by indicating high or critical priority. The benefit line items connected to the selected project goals are thereby included in the customized tree.

FIG. 9 is a diagram illustrating an embodiment of a display of applicable benefit line items included in a customized hierarchical benefits tree. In this example, a number of benefit line items resulting from a user configuration process and their associated attributes are listed. One of the attributes is the measurability of the benefit line item. A benefit line item may be measurable (either currently measurable or measurable in the future), or difficult to quantify. Measurable benefit line items include metrics used to determine the amount of benefits achieved. Metrics are usually provided by the administrator and are preferably values that are concrete and easy to determine. In the example shown, the benefit line items are all associated with insurance fraud detection, and examples of the metrics include % of claims that are referred to special investigations unit for fraud detection purposes, number of days from first notice to fraud referral, average investigation cost per suspicious claim, etc.

Formulas based at least in part on the corresponding metrics are used to compute the estimated benefits. For example, to measure the amount of benefits provided by the "improved detection of potentially fraudulent claims" benefits line item, the following formula is used:

$$(\text{increase in referral \%})*(\text{claimant walks away on suspected fraudulent claim \%})*(\text{average cost per claim})*(\text{number of total claims})$$

While default formulas are provided in this example, in some embodiments, the user is allowed to adjust the formulas and/or parameters of the formulas. Take the formula given above as an example, the user may be allowed to adjust the percentages, the cost per claim and the number of total claims, assign weights to different parameters, etc. The estimated benefits are presented to the user to allow visual, direct comparison of benefits achieved. The benefits may be measured in financial terms, in cycle time, etc. In addition, benefits that are difficult to measure are also presented to the user so that they are not overlooked in the decision making process.

When the product under evaluation is complex, there can be many benefit line items. In some embodiments, presenting the measurable metrics associated with the customized BLIs includes providing reports to make the information more easily understood by the user.

Figure 11:
FIG. 11 is a diagram illustrating an embodiment of a user interface for displaying a benefits verification form.

FIG. 10 is a diagram illustrating an embodiment of a user interface for reporting the benefits achieved. In this example, financially measurable benefit line items are listed in descending order of benefits measured in dollar amounts. The user is given the option to enter a baseline value for the metric (i.e., the value for the metric today, without making the investment in the product), an expected value for the metric assuming that the product is installed and operating, as well as an estimated range on the low end and high end. The entries are stored to be used later for verifying the benefits actually achieve by the investment and for informing future investment decisions. FIG. 11 is a diagram illustrating an embodiment of a user interface for displaying a benefits verification form. Several benefit line items, the amount of estimated benefits, the metric and its baseline and expected values are displayed. The user is given the option to enter the actual benefit achieved at yearly intervals to compare the actual benefit realized with the expected benefit at the time of the investment decision.

In some embodiments, the benefit line items are further connected with features in the product under evaluation. This may be implemented by adding the product features as nodes in an additional hierarchical level below the benefit line items level or by generating separate data structures to store the product features and linking them to the benefit line items. FIG. 12 is a user interface diagram illustrating an embodiment of a user interface used to connect benefit line items with product features. In this example, several benefit line items connected to the project goal of improving fraud detection are listed. Each row lists the benefit line item, a metric associated with the benefit line item, and the product features (referred to as "Guidewire Enablements" in the figure) used to implement the particular benefit line item. The list of product features implementing the BLI is preferably configured by the administrator. When the user selects the "Guidewire Enablements" box, a list of all product features are displayed, where the relevant product features are checked. In the example shown, the "improved detection of potentially fraudulent claims" benefit line item is implemented by the following features in the product: duplicate payment checking, business rules, claim history and audit tracking, ClaimCenter data model, comprehensive notes function, first notice of loss (FNOL), geocoding, integration framework, ISO integration, Metro integration, single system or record, and unified claim folder. A feature may be used to support multiple benefit line items.

Figure 13:
FIG. 13 is a user interface diagram illustrating an embodiment of a report interface for product features.

Tying the features to the benefit line items further allows identification of the most useful/beneficial features in the product. In some embodiments, the number of times each feature is referenced by the benefit line items are tallied and reported to the user. FIG. 13 is a user interface diagram illustrating an embodiment of a report interface for product features. The features are sorted in descending order according to their respective number of times referenced by benefit line items. In some embodiments, for each benefit line item, weights are assigned to the referenced features so a measurable benefit (such as dollar amount or cycle time) can be attributed to the features. The total measurable benefits attributed to the features across all benefit line items are tallied and sorted to present the most beneficial features in terms of their measurable benefits. The features report allows the user to more easily compare the product under evaluation with current systems. For example, "unified claim folder" is shown to be a very useful tool referenced by 34 BLIs. If this feature is only available in the product under evaluation, it would indicate that there is significant benefit to be gained by adopting the product.

Presenting benefits of an insurance related product has been disclosed. By using a hierarchical benefits tree to represent different levels of objectives, benefit line items, and their connections, the technique allows for clear and visual depiction, evaluation, and verification of the product's benefits and features.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for presenting benefits of an insurance related product, comprising:
  one or more processors configured to:
    obtain a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company;
    receive a user selection of at least some nodes in the master hierarchical benefits tree;
    determine a set of available nodes in a next hierarchical level based at least in part on the user selection; and
    generate a customized hierarchical benefits tree that is formed based at least in part on the user selection and the master hierarchical benefits tree; and
  one or more memories coupled to the one or more processors, configured to provide the one or more processors with instructions;
  wherein:
    at least one of the plurality of hierarchical levels comprises a plurality of benefit line items indicating specific benefits achieved by the insurance related product; and
    at least one of the benefit line items includes a metric used to compute a benefit associated with the benefit line item.

2. The system of claim 1, wherein the customized hierarchical benefits tree comprises the user selection and benefit line items associated with at least some of the user selection.

3. The system of claim 1, wherein the customized hierarchical benefits tree comprises the user selection.

4. The system of claim 1, wherein the one or more processors are configured to repeat receiving a second user selection of at least some of the set of available nodes in the next hierarchical level, and determining a second set of available nodes in a subsequent next hierarchical level based at least in part on the second user selection.

5. The system of claim 1, wherein the plurality of benefit line items are implemented by a plurality of product features of the insurance related product.

6. A system for presenting benefits of an insurance related product, comprising:
- one or more processors configured to:
  - obtain a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company, at least one of the plurality of hierarchical levels comprising a plurality of benefit line items indicating specific benefits achieved by the insurance related product
  - receive a user selection of at least some nodes in the master hierarchical benefits tree;
  - determine a set of available nodes in a next hierarchical level based at least in part on the user selection;
  - generate a customized hierarchical benefits tree that is formed based at least in part on the user selection and the master hierarchical benefits tree;
  - receive an expected performance level associated with a metric of one of the plurality of benefit line items; and
  - compare a measured performance level with the expected performance level; and
- one or more memories coupled to the one or more processors, configured to provide the one or more processors with instructions.

7. A system for presenting benefits of an insurance related product, comprising:
- one or more processors configured to:
  - obtain a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company;
  - receive a user selection of at least some nodes in the master hierarchical benefits tree;
  - determine a set of available nodes in a next hierarchical level based at least in part on the user selection; and
  - generate a customized hierarchical benefits tree that is formed based at least in part on the user selection and the master hierarchical benefits tree; and
- one or more memories coupled to the one or more processors, configured to provide the one or more processors with instructions;
- wherein:
  - at least one of the plurality of hierarchical levels comprises a plurality of benefit line items indicating specific benefits achieved by the insurance related product; and
  - the plurality of benefit line items are implemented by a plurality of product features of the insurance related product, and
- the processor is further configured to report the plurality of product features.

8. A system for presenting benefits of an insurance related product, comprising:
- one or more processors configured to:
  - obtain a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company;
  - receive a user selection of at least some nodes in the master hierarchical benefits tree;
  - determine a set of available nodes in a next hierarchical level based at least in part on the user selection; and
  - generate a customized hierarchical benefits tree that is formed based at least in part on the user selection and the master hierarchical benefits tree; and
- one or more memories coupled to the one or more processors, configured to provide the one or more processors with instructions;
- wherein:
  - at least one of the plurality of hierarchical levels comprises a plurality of benefit line items indicating specific benefits achieved by the insurance related product; and
  - the plurality of benefit line items are implemented by a plurality of product features of the insurance related product; and
- the one or more processors are further configured to report number of times a product feature is referenced by the plurality of benefit line items.

9. A method of presenting benefits of an insurance related product, comprising:
- obtaining, using one or more computer processors, a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company;
- receiving a user selection of at least some nodes in the master hierarchical benefits tree;
- determining a set of available nodes in a next hierarchical level based at least in part on the user selection; and
- generating a customized hierarchical benefits tree that is formed based at least in part on the user selection and the master hierarchical benefits tree; wherein:
- at least one of the plurality of hierarchical levels comprises a plurality of benefit line items indicating specific benefits achieved by the insurance related product; and
- at least one of the benefit line items includes a metric used to compute benefit associated with the benefit line item.

10. The method of claim 9, wherein the customized hierarchical benefits tree comprises the user selection and benefit line items associated with at least some of the user selection.

11. The method of claim 9, wherein the customized hierarchical benefits tree comprises the user selection.

12. The method of claim 9, further comprising repeating receiving a second user selection of at least some of the set of available nodes in the next hierarchical level, and determining a second set of available nodes in a subsequent next hierarchical level based at least in part on the second user selection.

13. The method of claim 9, wherein the plurality of benefit line items are implemented by a plurality of product features of the insurance related product.

14. A method for presenting benefits of an insurance related product, comprising:
- obtaining a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company, and at least one of the plurality of hierarchical levels comprising a plurality of benefit line items indicating specific benefits achieved by the insurance related product;

receiving a user selection of at least some nodes in the master hierarchical benefits tree;

determining a set of available nodes in a next hierarchical level based at least in part on the user selection;

generating a customized hierarchical benefits tree that is formed based at least in part on the user selection and the master hierarchical benefits tree;

receiving an expected performance level associated with a metric of one of the plurality of benefit line items; and comparing a measured performance level with the expected performance level.

15. A method for presenting benefits of an insurance related product, comprising:

obtaining a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company, at least one of the plurality of hierarchical levels comprising a plurality of benefit line items indicating specific benefits achieved by the insurance related product, and the plurality of benefit line items being implemented by a plurality of product features of the insurance related product;

receiving a user selection of at least some nodes in the master hierarchical benefits tree;

determining a set of available nodes in a next hierarchical level based at least in part on the user selection;

generating a customized hierarchical benefits tree that is formed based at least in part on the user selection and the master hierarchical benefits tree; and reporting the plurality of product features.

16. A method for presenting benefits of an insurance related product, comprising:

obtaining a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company, at least one of the plurality of hierarchical levels comprising a plurality of benefit line items indicating specific benefits achieved by the insurance related product, and the plurality of benefit line items being implemented by a plurality of product features of the insurance related product;

receiving a user selection of at least some nodes in the master hierarchical benefits tree;

determining a set of available nodes in a next hierarchical level based at least in part on the user selection;

generating a customized hierarchical benefits tree that is formed based at least in part on the user selection and the master hierarchical benefits tree; and reporting number of times a product feature is referenced by the plurality of benefit line items.

17. A computer program product for of presenting benefits of an insurance related product, the computer program product being embodied in a tangible non-transitory computer readable storage medium and comprising computer instructions for:

obtaining a master hierarchical benefits tree comprising a plurality of hierarchical levels, each hierarchical level comprising a plurality of nodes, at least one node in one hierarchical level is preconfigured to be connected to at least one node in an adjacent hierarchical level, the preconfiguration being based at least in part on categorized objectives of an insurance company;

receiving a user selection of at least some nodes in the master hierarchical benefits tree;

determining a set of available nodes in a next hierarchical level based at least in part on the user selection; and generating a customized hierarchical benefits tree that is formed based at least in part on the user selection and the master hierarchical benefits tree; wherein:

one of the plurality of hierarchical levels comprises a plurality of benefit line items indicating specific benefits achieved by the insurance related product; and at least one of the benefit line items includes a metric used to compute benefit associated with the benefit line item.

* * * * *

UNITED STATES PATENT AND TRADEMARK OFFICE
CERTIFICATE OF CORRECTION

PATENT NO. : 8,650,050 B1  
APPLICATION NO. : 13/197103  
DATED : February 11, 2014  
INVENTOR(S) : Eugene Lee Page 1 of 1

It is certified that error appears in the above-identified patent and that said Letters Patent is hereby corrected as shown below:

Claims

In column 11, line 14, claim 6, after "product", insert -- ; --.

In column 14, line 18, claim 17, after "product for", delete "of".

Signed and Sealed this  
Twenty-eighth Day of June, 2016

Michelle K. Lee  
*Director of the United States Patent and Trademark Office*